United States Patent [19]

Sakamoto et al.

[11] Patent Number: 4,786,102
[45] Date of Patent: Nov. 22, 1988

[54] SUNROOF APPARATUS OF VEHICLE ROOF

[75] Inventors: Hiroshi Sakamoto, Higashi-Hiroshima; Akefumi Takeda, Hiroshima; Manabu Sumitani, Kure, all of Japan

[73] Assignee: Webasto AG Fahrzeugtechnik, Gauting, Fed. Rep. of Germany

[21] Appl. No.: 38,498

[22] Filed: Apr. 15, 1987

[30] Foreign Application Priority Data

Apr. 15, 1986 [JP] Japan ................. 61-87298

[51] Int. Cl.⁴ ............................ B60J 7/047; B60J 7/11
[52] U.S. Cl. ................................ 296/216; 296/218; 296/220
[58] Field of Search ............... 296/216, 218, 220, 221, 296/215

[56] References Cited

U.S. PATENT DOCUMENTS

| 1,854,972 | 4/1932 | Austin | 296/216 |
| 2,122,712 | 7/1938 | Bishop | 296/220 |
| 2,215,022 | 9/1940 | Votypka | 296/215 |
| 4,142,761 | 3/1979 | Lutz et al. | |

FOREIGN PATENT DOCUMENTS

| 1946161 | 9/1978 | Fed. Rep. of Germany . | |
| 2468477 | 5/1981 | France | 296/215 |
| 0044530 | 3/1982 | Japan | 296/216 |
| 158120 | 9/1982 | Japan . | |
| 150017 | 9/1982 | Japan . | |
| 14328 | 3/1983 | Japan . | |
| 157822 | 10/1983 | Japan . | |
| 573355 | 11/1945 | United Kingdom | 296/220 |
| 813492 | 5/1959 | United Kingdom | 296/215 |
| 2113623 | 8/1983 | United Kingdom | 296/220 |
| 2122250 | 1/1984 | United Kingdom . | |

Primary Examiner—Dennis H. Pedder
Attorney, Agent, or Firm—Sixbey, Friedman, Leedom & Ferguson

[57] ABSTRACT

A vehicle roof having a fixed roof structure through which a roof opening extends and which is closable and selectively openable by a sunroof apparatus having a pair of cover panels which, in a position closing the roof opening, are disposed one behind the other in the vehicle longitudinal direction. The front panel is displaceable from its closed position into an upwardly tilted position and, while upwardly tilted, is rearwardly slidable to a position in which a rear portion of the front cover panel projects over the rear cover panel or, when the rear cover panel (which is detachably mounted) is removed, projects over a rear edge of the roof opening. The construction of the sunroof apparatus enables the roof opening to extend approximately the full length of the fixed roof structure.

12 Claims, 3 Drawing Sheets

SUNROOF APPARATUS OF VEHICLE ROOF

BACKGROUND OF THE INVENTION

The invention relates to vehicle roofs having a sunroof apparatus for closing and selectively, at least partially, opening an opening that extends through the fixed roof of a motor vehicle. In particular, the invention pertains to a vehicle roof sunroof apparatus wherein the roof opening is covered by two movable roof panels which, in their position closing the vehicle roof opening, lie one behind the other and wherein, for at least partially uncovering the roof opening, the front panel is upwardly tiltable and is rearwardly displaceable.

From German Pat. No. 19 46 161, a vehicle roof of this general type is known that has a pair of movable cover panels which, in the closed position thereof, lie one behind the other in the longitudinal direction of the vehicle. These cover panels are displaceable, from their position closing the opening through the fixed vehicle roof, in a number of different modes for purposes of partially uncovering the roof opening. In a first mode, the front cover panel is upwardly tiltable to provide ventilation of the vehicle interior, and with the front panel in this upwardly tilted mode, optionally, the rear panel may be lowered and slidably retracted underneath the fixed roof structure so as to expose the rear half of the roof opening. Alternatively, this sliding retraction of the rear cover panel may be carried out while the front cover panel remains in its lowered position closing the front half of the roof opening or, selectively, the lowered front panel can be slid rearwardly into the position formerly occupied by the rear panel in its closed position, thereby the expose the front half of the vehicle roof opening. However, such a vehicle sunroof apparatus is subject to disadvantages which limit the size of the roof opening that can be provided in the fixed roof structure and the extend to which it can be exposed. That is, since the rear panel must be retracted underneath the fixed roof surface, the extent to which the opening through the fixed roof structure can be rearwardly extended is thereby limited. This disadvantage is further compounded by the fact that the movable cover panels can never be placed in a condition which substantially completely exposes the entire roof opening.

An upwardly tiltable sunroof apparatus is known from U.S. Pat. No. 4,142,761 which has a single cover panel that can selectively be tilted upwardly or totally removed. However, since a person has to be able to lift off the cover panel and store it, for example, in the vehicle trunk, limitations upon the size of the cover panel, and therefore, upon the size of the roof opening, are accordingly imposed.

Another single panel sunroof apparatus is known from British Pat. No. 2,122,250 which is of the so-called "spoiler" roof type, wherein the cover panel is upwardly tiltable and then rearwardly slidable to a position in which the rear portion of the cover panel is disposed above the rest area of the fixed roof structure of the motor vehicle, thereby substantially completely exposing the opening in the vehicle roof. However, if the size of the portion of the cover panel that is cantilevered above the rear fixed roof area of the vehicle is too large, it will be subjected to excessively high loads when the vehicle is driven at high speeds. Thus, even with a spoiler roof of this type, restrictions are imposed upon the size of the roof opening that can be provided.

As a result, even though it is desirable to have a roof opening in a vehicle that is as large as possible and can be exposed to the greatest extend possible, since a function of a sunroof apparatus is for ventilation and lighting, sunroof apparatus of vehicle roofs as known to date have, effectively, been unable to permit more than one-half of the full length of the roof to be opened.

SUMMARY OF THE INVENTION

A primary object of the present invention is to provide a sunroof apparatus of a vehicle roof which will enable the roof opening to extend at least approximately over the full length of the fixed roof surface and which has a pair of cover panels that can be, selectively, shifted from a position closing the roof opening to positions partially opening a portion of the roof opening or substantially completely exposing the roof opening.

This object is achieved, in accordance with a preferred embodiment of the present invention, by forming a roof opening in the fixed vehicle roof structure that extends at least approximately over the full length of the vehicle roof and which is closable by a pair of cover panels which, in the closed position of the vehicle roof, are disposed one behind the other in the vehicle longitudinal direction, but which can be selectively opened in a number of manners to partially or substantially fully expose the roof opening. In particular, the front cover panel is mounted for upward tilting and, while upwardly tilted, rearward sliding in the manner of a spoiler roof, while the rear cover panel is detachably removable. Thus, the front half of the roof opening can be partially exposed by merely upwardly tilting the front cover panel, or only the rear half of the roof opening can be fully exposed by removing the rear cover panel. Likewise, substantially the entire front half of the roof opening can be exposed by upward tilting and rearward sliding of the front cover panel over the rear cover panel, or substantially the entire roof opening can be exposed by removable of the rear cover panel and upward tilting and rearward retraction of the front cover panel to a position overlying the rear portion of the fixed roof surface of the motor vehicle.

These and further objects, features and advantages of the present invention will become more obvious from the following description when taken in connection with the accompanying drawings which show, for purposes of illustration only, a single embodiment in accordance with the present invention.

DETAILED DESCRIPTION OF THE PREFERRED EMBODIMENT

Figure 1:
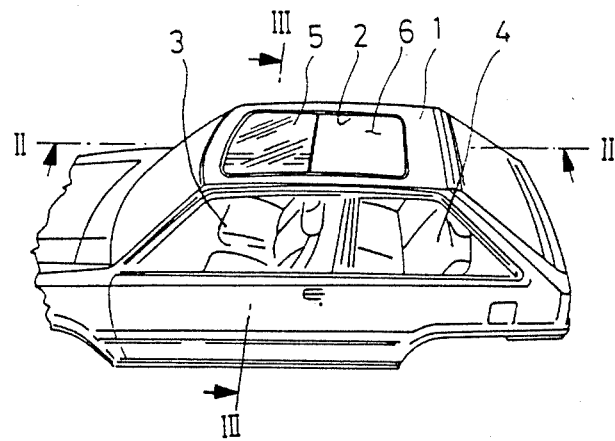
FIG. 1 is a partial perspective view of a motor vehicle with a sunroof apparatus in accordance with the present invention, the apparatus being shown in its position closing a roof opening.

In the drawings, a vehicle is shown having a fixed roof 1 within which a through opening 2 is formed. The roof opening 2 is substantially rectangular an extends approximately over the full length of the fixed roof. In the case where the vehicle is a passenger car, the roof opening 2 extends above and across the front seat 3 and the rear seat 4. For closing the roof opening 2, a front cover panel 5 and a rear cover panel 6 are provided. The front cover panel 5 is constructed in the manner of a so-called spoiler type sunroof, whereby the rear portion of the cover panel 5 can be upwardly tilted and, while upwardly tilted, rearwardly displaced to a position overlying a rear area of the upper surface of the fixed roof 1. The rear cover panel 6, on the other hand, is constructed as a detachable type sunroof panel which may be either fixed in place within the rear half of th roof opening 2, or detached and totally removed from the vehicle opening.

Figure 2:
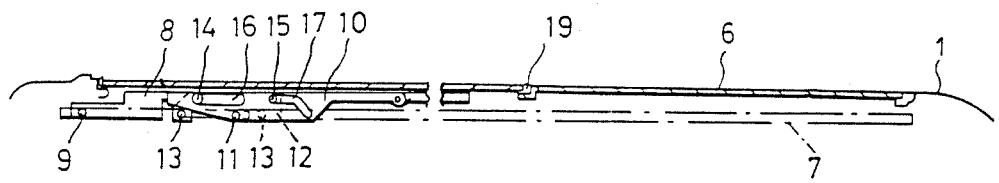
FIG. 2 is a longitudinal sectional view taken along line II—II of FIG. 1.
Figure 3:
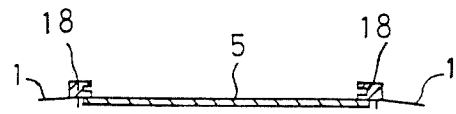
FIG. 3 is a transverse cross-sectional view taken along line III—III of FIG. 1.

As shown in FIG. 2, guide rails 7 are mounted under the fixed roof 1. These guide rails 7 extend the full longitudinal length of roof opening 2, at both the left and right sides of roof opening 2. At each side of the roof opening, a cover panel carrier 8 of the forward cover panel 5 is slidably engaged with a respective guide rail 7 via a slider 9 for movement in the longitudinal direction of the vehicle. Sliders 9, which are located on carriers 8 in the vicinity of the front end portion of the forward cover panel 5, also serve as a pivot axis about which the forward cover panel 5 may be vertically tilted up from its closed position of FIG. 2 into its raised position of FIGS. 48.

In a middle area of each cover panel carrier 8, the rear end of a tilting lever 10 is pivotally connected. The front portion of the tilting lever 10 is engaged with the guide rails 7 so as to be freely movable in the longitudinal direction of the vehicle along the guide rails and so as to be pivotably raisable relative thereto via sliders 11. In addition, each of the tilting levers 10 is pivotally supported in its central area by a respective transfer slide 12. Each transfer slide 12 is slidably engaged in a respective guide rail 7 via a pair of sliders 13. The transfer slide 12 and the tilting lever 10 are engaged with one another by means of a cam link arrangement that is comprised of a pair of cam pins 14, 15 which project from a side face of the transfer slide 12 into a respective one of the cam slots 16, 17 provided in the tilting lever 10.

Transfer slide 12 is moved in the longitudinal direction of the vehicle along guide rails 7 by a driving apparatus, for example, an electric motor or a crank which displaces a pressure resistant threaded cable (not shown). The manner in which such a cover panel may be upwardly tilted and rearwardly slid as well as a suitable operating device for it is known in the art as can be seen with reference to British Pat. No. 2,122,250. Thus, no further and more detailed explanation is believed to be necessary for those of ordinary skill in the art to have a complete understanding of the nature and operation of this aspect of the present invention.

The rear cover panel 6 is removably mounted within the rear portion of the roof opening 2 and is detachable for complete removal when it is desired that the rear portion of the roof opening will be exposed. The size of the removable rear cover panel 6 is designed to be small enough so that it may be accommodated in the vehicle trunk when it is removed. Alternatively, the rear cover panel 6, once removed from the roof opening 2, may be slid into rails 18 of the front cover panel 5 wherein it can be retained in place in a position parallel to the front cover panel 5. The means by which the rear cover panel 6 can be fixed in place within the rear portion of the roof opening 2 in a removable manner, as well as a suitable latch mechanism for temporarily retaining the rear cover panel 6 within the rails 18, are not shown. However, no novelty exists in such securement mechanisms, per se, and numerous suitable mechanisms will be immediately apparent to those of ordinary skill in the art so that detailed description thereof is believed to be unnecessary, beyond noting that a detent latch mechanism on the underside of the rear cover panel that is removably engageable in a complementary opening in the rails 18 would be one suitable way of securing the cover panel 6 to the cover panel 5 in its FIG. 8 relationship, while the use of a latch that can clamp onto rails 7 would be a suitable means for removably fixing the cover panel 6 within roof opening 2.

As shown in FIGS. 1 and 2, the roof opening 2 is completely closable by the cover panels 5, 6. In the fully closed condition, the cam pins 14, 15 of the transfer slide 12 are, as illustrated in FIG. 2, at the forward ends of cam slots 16, 17. To ensure against leakage at the junction of the rear edge of front cover panel 5 with the front edge of rear cover panel 6, these edges are brought into close contact via a resilient weather strip 19.

Figure 6:
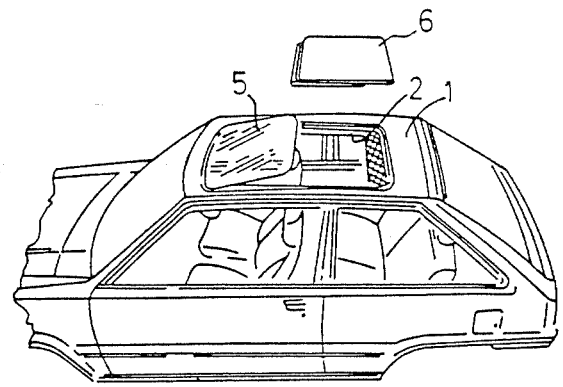
FIG. 6 is a perspective view similar to FIG. 1, but with the front cover panel only upwardly tilted and with the rear panel removed.

In order to tilt the rear portion of the front cover panel 5 upwardly from the fully closed position, to that illustrated in FIG. 6, the transfer slide 10 is moved rearwardly. Rearward movement of the transfer slide 10 produces relative movement of the cam grooves 16, 17 with respect to the cam pins 14, 15. Thus, as the cam pins 14, 15 move from the front ends of cam slots 16, 17, to the rear ends thereof, the rear portion of the font cover panel 5 is upwardly tilted without the cover panel being longitudinally displaced relative to the fixed roof surface 1. With the front cover panel 5 in this position, the passenger compartment can be ventilated while leaving the rear cove panel 6 in place, or the removable rear cover panel 6 can be detached (as shown in FIG. 6) in order to expose the roof opening above the rear seat area.

Figure 4:
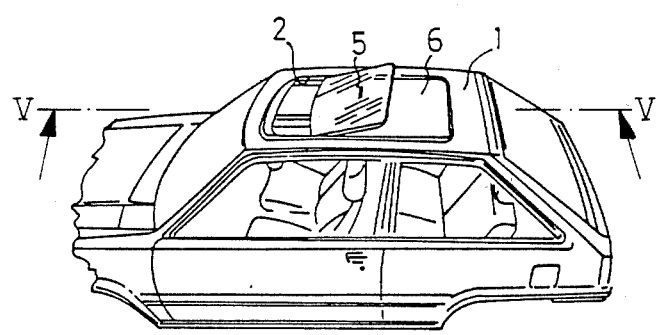
FIG. 4 is a perspective view corresponding to FIG. 1, but with the front cover panel of the sunroof apparatus shown in its position outwardly tilted and rearwardly shifted over the rear cover panel.
Figure 5:
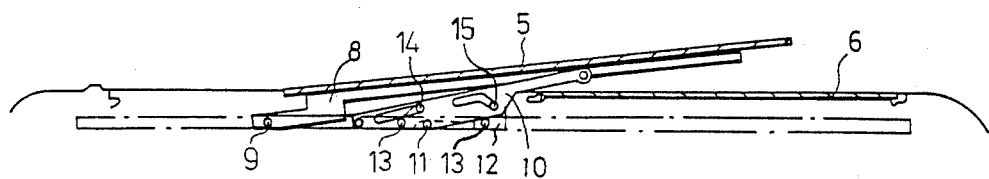
FIG. 5 is a longitudinal section taken along line V—V of FIG. 4.
Figure 7:
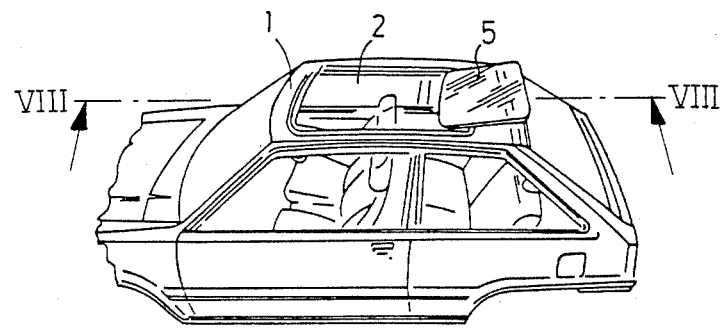
FIG. 7 is a perspective view similar to FIG. 1, but with the rear panel removed and the front panel in its position upwardly tilted and rearwardly displaced to a position overlying the rear area of the fixed roof.
Figure 8:
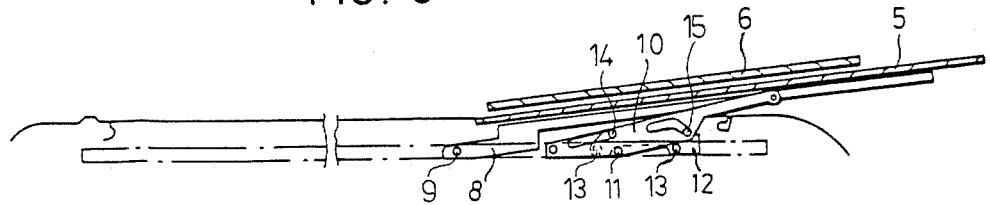
FIG. 8 is a longitudinal section taken along line VIII—VIII of FIG. 7.

Alternatively, if the transfer slide 12 is continued to be moved rearwardly from the point at which the cam pins 14, 15 reach the rear ends of the cam grooves 16, 17, the upwardly tilted front cover panel 5 will be caused to slide rearwardly together with the movement of the transfer slide 12 into the condition shown in FIGS. 4 and 5, if the rear cover panel 6 has been left in place. As a result, substantially the entire front half of the roof opening 2 will be exposed. On the other hand, if the rear roof panel 6 has been removed from the roof opening 2, the front cover panel 5 may be slidably shifted (by continued rearward movement of transfer slide 12) to its rearmost position, wherein the rear portion of panel 5 is disposed above the topside of the portion of the fixed roof that is located rearwardly of the roof opening 2, as shown in FIGS. 7 and 8. Accordingly, the roof opening 2 will be substantially completely exposed above both the front and rear seat areas of the vehicle passenger compartment.

It should be appreciated that, as a result of the present invention, sunroof apparatus can be more versatilely constructed and the longitudinal extend of a vehicle roof which may be opened can be made significantly greater than with other known roofs to thereby achieve better ventilation and natural lighting of the vehicle interior.

Furthermore, it should be appreciated that the present invention is not restricted to the particular embodiment illustrated which utilizes only a pair of cover panels, front cover panel of the spoiler type, and a rear panel that can be detached and removed from the roof opening completely. That is, the rear cover panel could be subdivided into two or more panel parts when available storage space is very limited. Also, it is possible for the front cover panel to constructed in the manner of lamination type sunroof having louvre-like roof sections as such is known from German Auslegeschrift No. 32 02 646 and corresponding U.K. Pat. No. 2 113 623. Furthermore, it should be appreciated that the invention is susceptible of numerous other changes and modifications as are known to a person skilled in the art. We therefore do not wish to be limited to the details shown and described herein, but intend to cover all such changes and modifications as are encompassed by the scope of the appended claims.

We claim:

1. Vehicle roof with a sunroof apparatus, comprising a fixed roof structure having a roof opening therethrough and a pair of cover panels by which respective front and rear portions of the roof opening can be selectively closed and at least partially opened, said panels, in a closed position, being arranged one behind the other in a longitudinal direction of the vehicle roof, wherein said roof opening extends over approximately the full length of the fixed roof structure, wherein a rear one of the cover panels is a stationary panel that is attached with the fixed roof structure in a position closing the rear portion of the roof opening and is detachably removable from its attached position to expose the rear portion of the roof opening, and wherein a front one of the cover panels is mounted by tilting and sliding means for upward tilting and, while upwardly tilted, for rearward sliding to a position in which at least a rear portion of the front cover panel projects over the rear cover panel when said rear cover panel is in said attached position and over a rear edge of the roof opening when said rear cover panel has been detached.

2. Vehicle roof with a sunroof apparatus according to claim 1, wherein said front cover panel is provided with means for holding the rear cover panel, after removal of the rear cover panel, in a position parallel to the front cover panel.

3. Vehicle roof with a sunroof apparatus according to claim 2, wherein said means for holding comprises a rail mounted on top of the front cover panel at each lateral side thereof.

4. Vehicle roof with a sunroof apparatus according to claim 3, wherein the mounting of the front cover panel comprises a panel carrier, said panel carrier being pivotally and slidably displaceable relative to lateral guide rails, which extend along the lateral sides of the roof opening, via sliders connected to a front end of the panel carrier.

5. vehicle roof with a sunroof apparatus according to claim 4, wherein a tilting lever is provided, said tilting lever having a rear end pivotally connected at the panel carrier, being pivotally connected to a further slider and being slidable along a respective one of said lateral guide rails.

6. Vehicle roof with a sunroof apparatus according to claim 5, wherein a transfer slide is provided that is mounted for sliding along the respective lateral guide rail, said tilting lever being connected to said transfer slide in a manner permitting limited longitudinal movement of the transfer slide relative to the tilting lever and which, by said relative longitudinal movement, produces pivoting of said tilting lever relative to said transfer slide.

7. Vehicle roof with a sunroof apparatus according to claim 2, wherein the mounting of the front cover panel comprises a panel carrier, said panel carrier being pivotally and slidably displaceable relative to lateral guide rails, which extend along the lateral sides of the roof opening, via sliders connected to a front end of the panel carrier.

8. Vehicle roof with a sunroof apparatus according to claim 7, wherein a tilting lever is provided, said tilting lever having a rear end pivotally connected at the panel carrier, being pivotally connected to a further slider and being slidable along a respective one of said lateral guide rails.

9. Vehicle roof with a sunroof apparatus according to claim 8, wherein a transfer slide is provided that is mounted for sliding along the respective lateral guide rail, said tilting lever being connected to said transfer slide in a manner permitting limited longitudinal movement of the transfer slide relative to the tilting lever and which, by said relative longitudinal movement, produces pivoting of said tilting lever relative to said transfer slide.

10. Vehicle roof with a sunroof apparatus according to claim 1, wherein the mounting of the front cover panel comprises a panel carrier, said panel carrier being pivotally and slidably displaceable relative to lateral guide rails, which extend along the lateral sides of the roof opening, via sliders connected to a front end of the panel carrier.

11. Vehicle roof with a sunroof apparatus according to claim 10, wherein a tilting lever is provided, said tilting lever having a rear end pivotally connected at the panel carrier, being pivotally connected to a further slider and being slidable along respective one of said lateral guide rails.

12. Vehicle roof with a sunroof apparatus according to claim 11, wherein a transfer slide is provided that is mounted for sliding along the respective lateral guide rail, said tilting lever being connected to said transfer slide in a manner permitting limited longitudinal movement of the transfer slide relative to the tilting lever and which, by said relative longitudinal movement, produces pivoting of said tilting lever relative to said transfer slide.

* * * * *